United States Patent [19]

Kakihara et al.

[11] Patent Number: 5,274,387
[45] Date of Patent: Dec. 28, 1993

[54] NAVIGATION APPARATUS FOR VEHICLES

[75] Inventors: Masaki Kakihara, Kronberg, Fed. Rep. of Germany; Futoshi Shoji; Masao Sasaki, both of Hiroshima, Japan; Yasuyuki Masaki, Sagamihara, Japan

[73] Assignee: Mazda Motor Corporation, Hiroshima, Japan

[21] Appl. No.: 923,004

[22] Filed: Jul. 30, 1992

Related U.S. Application Data

[63] Continuation of Ser. No. 710,578, Jun. 5, 1991, abandoned.

[30] Foreign Application Priority Data

Jun. 6, 1990 [JP] Japan ................... 2-148137

[51] Int. Cl.$^5$ .................... G01S 3/02; G01C 21/00
[52] U.S. Cl. .................... 342/451; 342/457; 364/449
[58] Field of Search .......... 342/457, 451, 357; 364/449, 444

[56] References Cited

U.S. PATENT DOCUMENTS

| | | | |
|---|---|---|---|
| 4,086,632 | 4/1978 | Lions | 364/444 |
| 4,428,057 | 1/1984 | Setliff et al. | 364/444 |
| 4,514,810 | 4/1985 | Ito et al. | 364/424 |
| 4,543,572 | 9/1985 | Tanaka et al. | 364/449 |
| 4,570,227 | 2/1986 | Tachi et al. | 364/444 |
| 4,677,563 | 6/1987 | Itoh et al. | 364/449 |
| 4,796,189 | 1/1989 | Nakayama et al. | 364/444 |
| 4,862,374 | 8/1989 | Ziemann | 364/449 |
| 5,084,822 | 1/1992 | Hayami | 364/449 |

FOREIGN PATENT DOCUMENTS

3613195A1 4/1986 Fed. Rep. of Germany.

OTHER PUBLICATIONS

Funkschau, 19/1986, pp. 49–52.
Nahverkehrs-praxis Nr. Nov. 1987, p. 435.

Primary Examiner—Gregory C. Issing
Attorney, Agent, or Firm—Price, Heneveld, Cooper, DeWitt & Litton

[57] ABSTRACT

A navigation apparatus for vehicles has a display device for displaying map information. On the screen of the display device, a current position of the vehicle on which this navigation apparatus is mounted is displayed. Also, a route to a preset destination starting from the current position is displayed at the maximum length.

8 Claims, 15 Drawing Sheets

| OUTLINE DATA (VECTOR) |
|---|
| NAME DATA |
| GRAPHIC DATA |

FIG. 2A

| "1" | ID | NAME | ONE-WAY | VECTOR | LINKAGE TO A SUBSEQUENT SCREEN |
|---|---|---|---|---|---|

FIG. 2B

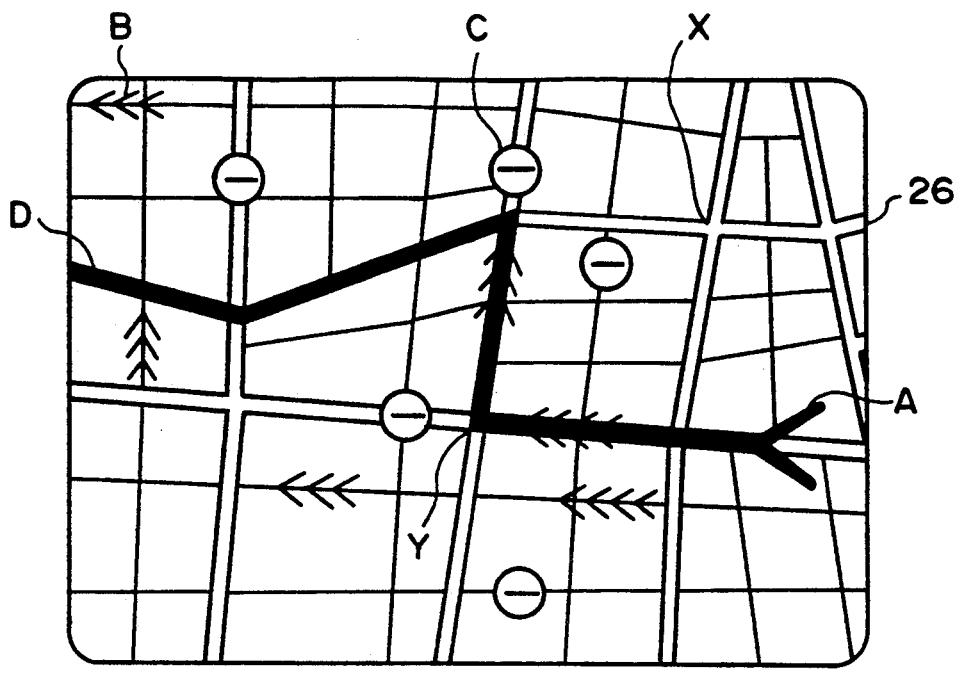
F I G. 6A
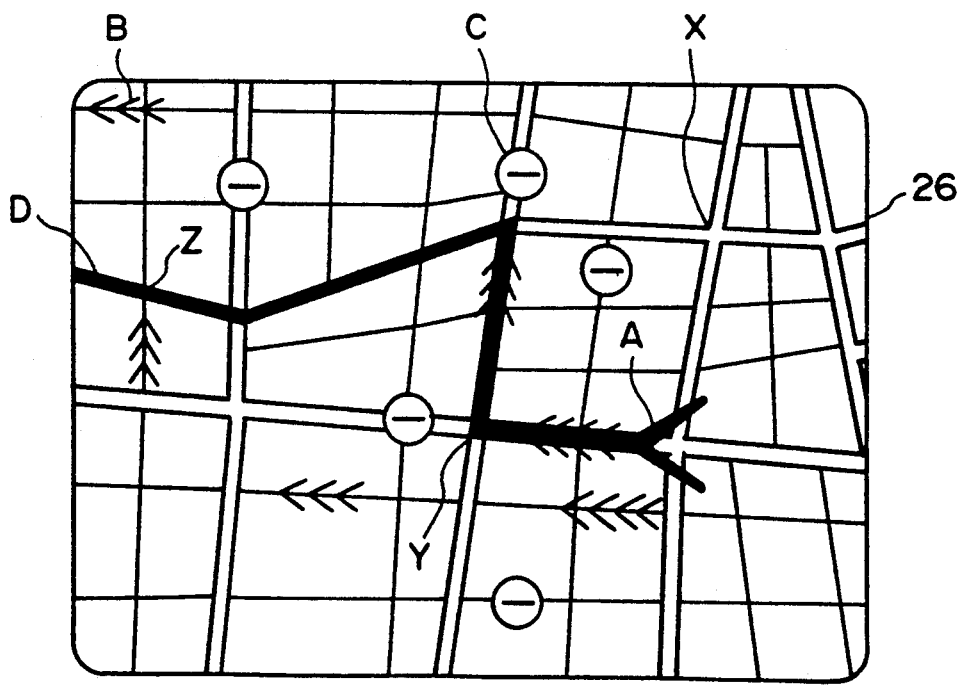
F I G. 6B

| | |
|---|---|
| R1 | F29 ~ F2 |
| R2 | F2 ~ F7 |
| R3 | F7 ~ F10 |
| R4 | F10 ~ F14 |
| R5 | F14 ~ F17 |
| R6 | F17 ~ F22 |
| R7 | F22 ~ F25 |
| R8 | F25 ~ F29 |

FIG. 13

NAVIGATION APPARATUS FOR VEHICLES

This is a continuation of co-pending application Ser. No. 07/710,578 filed on Jun. 5, 1991, now abandoned.

BACKGROUND OF THE INVENTION

The present invention relates to a navigation apparatus which displays on such CRT display a combination of both the route which a vehicle may take and the current position of the vehicle.

Generally, such navigation apparatuses have been designed to display map information stored in a large-capacity storage device, such as a CD-ROM, on a CRT screen. The map information may be the courses, names, distances and directions of roads, the places located along the roads, the locations and names of intersections, and the locations and names of buildings.

Navigation systems having means for receiving traffic information through the radio are also known. In such a navigation system, all the traffic information that can be displayed at that time is displayed on a CRT screen in accordance with data obtained by the reception means and from road information stored internally, which is called "internal road information". Such a navigation system is disclosed in, for example, Japanese Kokai No. 63-231477.

Since the purpose of the navigation system is to make the driver aware of the location of the vehicle on the screen, the vehicle position must always be displayed with a map image as background. Display of the vehicle position with the map image in the background may be done in any of the following methods:

(1): Firstly, the vehicle position is fixed to one position on the screen (generally, to the central position), and the background image is scrolled as the vehicle moves forward. This first method is in turn classified into the (1)-1 and (1)-2 methods:

In the (1)-1 method, the top of the display screen is fixedly directed to, for example, the north. The background map image scrolls in parallel with the direction of the marker/symbol of the vehicle. Although the marker is fixed on one position on the screen, it changes its direction to coincide with the actual direction of travel, and the background image scrolls appropriately coincident with the change in the direction of the marker.

In the (1)-2 method, the marker does not change its direction coincident with the change in the direction of the vehicle. However, the background map image moves in parallel and also rotates coincident with the actual movement of the vehicle.

(2): Secondly, a single-image section of a map is fixedly displayed with the top of the map fixedly directed to the north. The vehicle marker moves along the fixed image of the map until the vehicle reaches the edge portion of the map image. At that time, and thereafter, further non-scrolling sections of the map appear successively.

(3): In another conventional navigation system, when the destination is input on the map on the screen, the recommended to that destination is automatically chosen by the system, and displayed on the map.

(4): In still another system, the driver manually inputs the route which he or she will take, and that route is displayed.

Displaying both the route the driver will take and the current position of the vehicle is advantageous because the driver can recognize the current position of the vehicle along that route whose road and traffic information is the most important to the driver.

The navigation system which shows a combination of both the route and the current position of the vehicle generally displays only the route along which the vehicle moves forward. At best, it contains corners at which the vehicle may make a turn. Therefore, such a navigation system suffers from the following drawbacks. In the display method itemized by (2), as the vehicle position moves along the displayed route, the length of the route left gets shorter. Further it will eventually come to the end of the screen. At that time, there is no further display of the route, and the driver may not be able to recognize the current position of the vehicle. In the method (1), if the position of the marker/symbol of the vehicle is in the center of the screen, the length of the displayed route is about a half of the overall length of the screen, at most. This is disadvantageous from the viewpoint of effective utilization of the narrow display screen.

SUMMARY OF THE INVENTION

In view of the aforementioned disadvantages of the conventional navigation systems, an object of the present invention is to provide a navigation apparatus for vehicles which is designed so that when a route which the driver will take is displayed on the screen of a display device, the route and the roads and traffic information on the neighborhood of the route can be displayed as much as possible so as to allow the driver to have an accurate grasp of the route and to adequately recognize the information required for driving.

To achieve this object, the present invention provides a navigation apparatus for vehicles which has the display means for displaying map information. The navigation apparatus further comprises:

route setting means for setting a route which a driver will take to get to a destination from a starting position of a vehicle, on the basis of the map information;

estimation means for estimating a current position of the vehicle;

specification means for specifying the estimated current position of the vehicle on the set route; and display area setting means for setting a display area of the map information such that the current position of the vehicle estimated by said estimation means can be displayed on the screen of said display means and such that the route starting from the current position can be displayed on the screen of said display means substantially at the maximum length.

As the route which the driver will take to the destination can be displayed on the whole display screen, the route and the road and traffic information on the neighborhood of the route can be displayed as much as possible. Consequently, the driver can have an accurate grasp of the route, and adequately recognize the information required for driving.

In one preferred form of the present invention, the route can be displayed on the screen of the display means substantially at the maximum length by placing the current position of the vehicle at the edge of the display area.

In another preferred form of the present invention, as the direction of the display area is fixed, the route can easily be displayed on the screen of the display means substantially at the maximum length.

In another preferred form of the present invention, the route can be displayed on the screen of the display means substantially at the maximum length by providing a plurality of reference points on the periphery of a memory for storing the image of the display area and by calculating the length of the route that will be displayed on the display area when the current position of the vehicle is located at one of the reference points.

In another preferred form of the present invention, on the starting screen set by the display area setting means, the marker representing the vehicle position moves along the image route to coincide with the movement of the vehicle.

In another preferred form of the present invention, the route which the vehicle will take is manually set by the driver or determined by the estimation of the navigation apparatus.

In another preferred form of the present invention, the plurality of reference points are narrowed to some candidate reference points so that the route can be displayed on the screen of the display means substantially at the maximum length at a high speed.

Other objects and advantages besides those discussed above will be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2A shows the structure of data stored in a CD-ROM 25a of the system of FIG. 1;

FIG. 2B shows the structure of road data which is part of the data of FIG. 2A;

FIGS. 6A and 6B show the enabled mode display control conducted in the system of FIG. 1;

FIGS. 11, 12 and 13 explain the principle of narrowing the reference points in the modification of the present invention.

DETAILED DESCRIPTION OF THE PREFERRED EMBODIMENTS

An embodiment of the present invention will be described with reference to the accompanying drawings.

Figure 1:
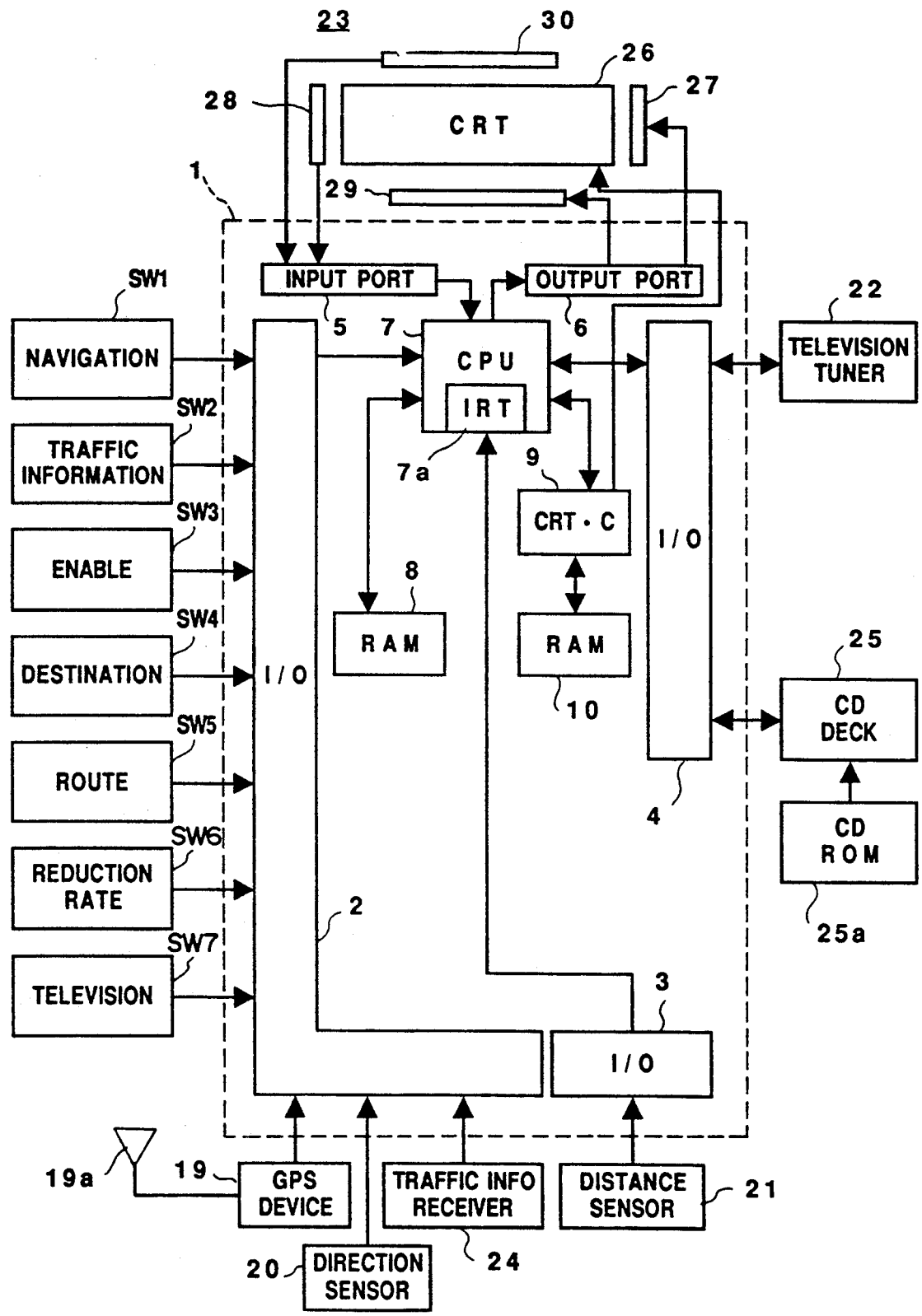
FIG. 1 is a block diagram of an embodiment of a navigation system according to the present invention.

FIG. 1 is a block diagram of the navigation system according to this embodiment. In this navigation system, when a route to the destination is set, the route starting from the current position of the vehicle is displayed on the display screen at the maximum length.

Structure of the System

The configuration of the navigation system shown in FIG. 1 will be described. This system includes a controller 1, a CRT 26 for displaying images for navigation or TV broadcast, a touch panel 23 which allows the CRT 26 to be used as a user interface and which consists of light-emitting diodes 27 and 29 and light-receiving elements 28 and 30, a television tuner 22, a CD deck 25 which is a CD player, a ROM 25a which is the recording medium, a group of various types of operation switches SW, a global positioning system (GPS) 19 which is the means for estimating the vehicle position, a direction sensor 20 for measuring the direction in which the vehicle is travelling, a distance sensor 21 for detecting the travelling distance, and a traffic information receiver 24 for inputting the "external map information".

The light-emitting diodes 27 and 29 and the light-receiving elements 28 and 30 in combination together with ports 5, 6 to CPU 7 form the touch panel 23 on the screen of the CRT 26. The touch panel 23 is used when the driver designates the destination or inputs a desired travelling route while viewing the display screen.

The group of switches SW1 to SW7 will be described in detail. Whether the CRT 26 is used as television display device or as navigation display device is determined by the driver's pressing the switch SW7 or SW1.

The vehicle position can be estimated by integrating the travelling distance detected by the distance sensor 21 at predetermined time intervals with the travelling direction detected by the senor 20 which detects the terrestrial magnetism taken into consideration. Since the detection of the terrestrial magnetism generates errors, the thus-obtained position of the vehicle is appropriately corrected using the vehicle position detected by the GPS device 19.

When the ENABLE switch SW3 is pressed by the driver, the function of displaying the longest route on the screen of the CRT 26, which characterizes this embodiment, is enabled.

Figure 3:
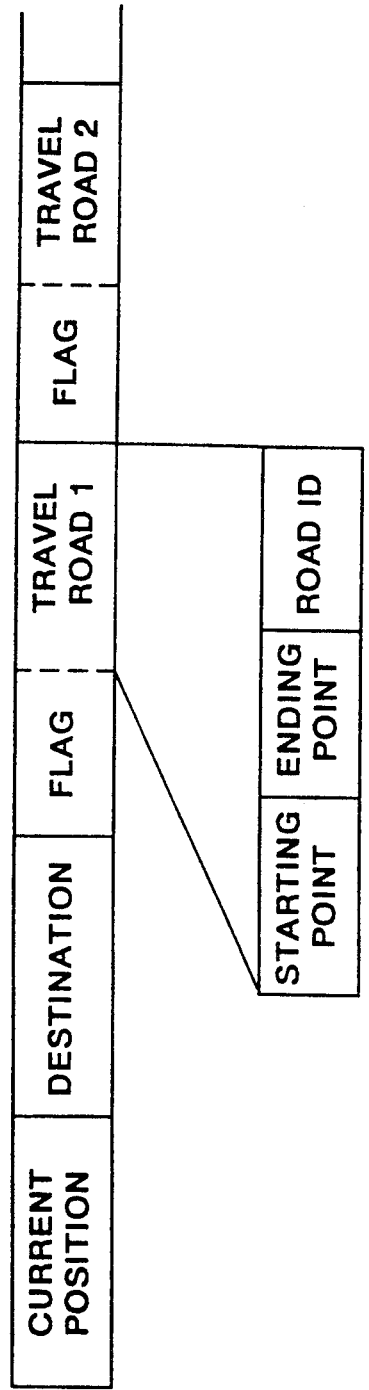
FIG. 3 shows the structure of data about a destination and a road on which the vehicle will travel (referred to as "travel road") to get to the destination.

When the driver presses the switch SW4 once, "destination input" mode is achieved and a destination can be input from the touch panel 23. Subsequent pressing of the switch SW4 cancels this mode. In this mode, the system regards the single coordinate position designated on the touch panel 23 as the destination, estimates or proposes the shortest route to the destination to the destination, and displays the roads along the shortest route on which the vehicle will travel on the CRT 26 in a different color from that for the other roads. The route to the destination that the system estimates consists of a plurality of "roads on which the vehicle will travel", as shown in FIG. 3. "The roads on which the vehicle will travel" are hereinafter referred to simply as "travel roads".

When the driver presses the switch SW5 once, "route input" mode is achieved and the route to the destination can be input from the touch panel 23. Subsequent pressing of the switch SW5 cancels the "route input" mode. In this mode, the position on the route which is input last is regarded as the destination.

The reduction rate switch SW6 is used for selection of the reduction scale of the map. When it is desired that the map be displayed in detail, a small reduction scale is designated.

Information Used in Navigation

FIG. 2A shows how the CR-ROM 25a is divided into several storage areas. In the CD-ROM 25a, the map information (internal map information) to be displayed on one screen on the minimum reduction scale is stored in blocks. The map information consists of "outline data", "name data" and "graphic data".

"Outline data" comprises the vector data representative of the outline of a road, river or the site of a building.

"Name data" comprises the character data representing the name of a road, the name of a building or the name of an intersection. The individual name data contains the displaying position where that name is to be displayed.

"Graphic data" comprises a figure which symbolizes a road, river or building. A one-way road is symbolized by the graphic "C" in FIG. 5. A road which is jammed with cars is symbolized by the graphic "B". The current position of the vehicle is symbolized by the graphic indicated by "A".

FIG. 2B shows how a road is indicated using the aforementioned "outline data", "name data" and "graphic data". In FIG. 2B, the first field is used for the type of data. In this case, "1" indicating that the data is the road data is stored. A subsequent field is used for the identification No. ID for identifying that road. The field following the ID field is used for a pointer indicating the position where "name data" (FIG. 2A) representing the name of that road is stored. The following field is used for the type of road (whether or not the road is a one-way road). A subsequent field is used for storing a pointer which specifies the symbol representative of that road (when necessary). The last field is used for storing the linkage of the outline data to a subsequent screen which follows the outline data displayed on this screen.

FIG. 3 shows the structure of the data of a route created when a destination and the route thereto are set by the driver or the system. In FIG. 3, the first field is used for the "current position" data. The system updates this "current position" data as the vehicle moves along. The subsequent filed is used for "destination" data. As stated above, the coordinate position representing the destination designated by the driver is stored in this field. The following fields are used for "travel roads" on which the vehicle will travel to get to the destination. The individual "travel road" data consists of a flag which indicates whether that travel road is designated by the driver or system, the coordinate positions of the staring and ending points of that travel road, and the ID of that road (the same as the ID shown in FIG. 2B).

Display Screen

The display conducted in the navigation system of this embodiment is characterized in that the top of the CRT screen is fixedly directed to the north, and in that the image memory 10 stores the map image of nine screens (see FIG. 4) to be displayed with the vehicle position at its center. The reading out speed from the CD-ROM 25a is slow, and hence storing the data representing the plurality of screens in the image memory 10 compensates for the speed at which background map scrolls. When the vehicle has moved and reached, for example, an end portion 300 of the rectangle indicated by the broken line in FIG. 4, image data representing the adjoining three screens is read out from the CD-ROM 25a.

Figure 4:
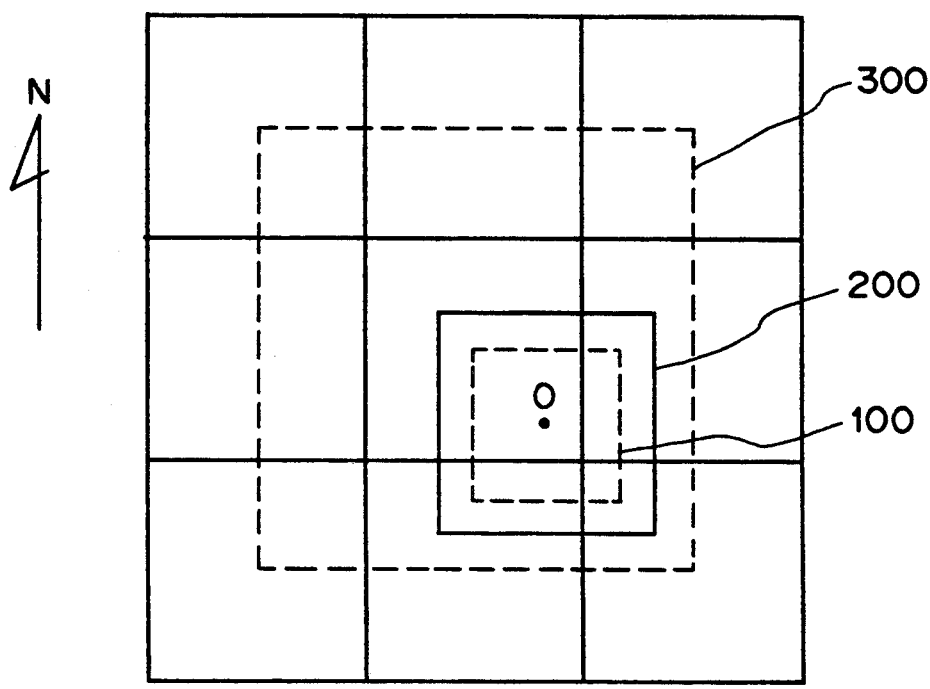
FIG. 4 explains the relation between the display screen and an image memory 10 in the system of FIG. 1.

In FIG. 4, an area 200 indicates the area which is being displayed on the CRT 26 at a certain time. A rectangle 100 indicates a set of a plurality of "reference positions" which will be described later.

Display Screen Control

The display screen control performed by this embodiment will be outlined with reference to FIGS. 4 to 6B.

Disabled Mode

Figure 5:
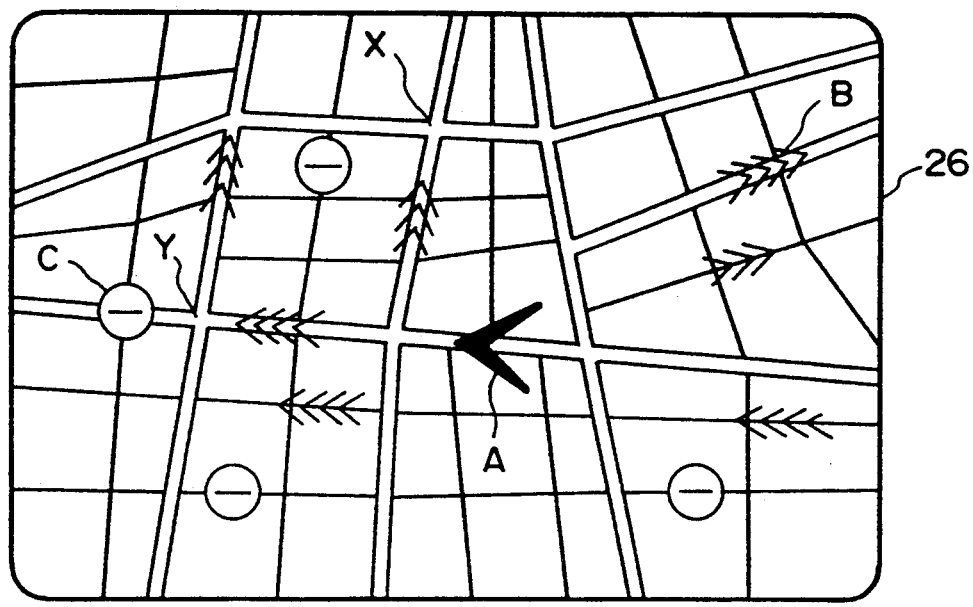
FIG. 5 shows the disabled mode display control conducted in the system of FIG. 1.

FIG. 5 shows the display screen of the CRT 26 when the system is in the "disabled" mode which is achieved by turning off the switch SW3. FIGS. 6A and 6B respectively show the display screens when the system is in the "enabled" mode.

The general display method for navigation in this navigation system will be described first. As shown in FIG. 5, the top of the CRT screen is fixedly directed to the north. When the system is in the disabled mode, the vehicle position "A" is always displayed at the center of the screen as shown in FIG. 5, and the background image scrolls coincident to the movement of the vehicle. The background image contains a map image including such as roads, and some data on a road (for example, data as to whether or not the road is a one-way road, as indicated by the graphic "C" in FIG. 5, or data as to whether or not the road is jammed with cars, as indicated by the graphic "B"). The marker A which symbolizes the vehicle comprises an arrow shown in FIG. 5. Although the marker is fixed on one position (the center position) of the screen, it changes its direction to coincide with the direction of travel of the vehicle. That is, the marker-rotates at the central position of the screen to coincide with the actual direction of the vehicle.

Although neither the destination nor the travel road to that destination is displayed in FIG. 5 for the disabled mode of this embodiment, a destination and travel roads may be displayed starting from the marker A, only when they are set by the driver.

Display is thus conducted in the disabled mode.

Enabled Mode

FIGS. 6A and 6B respectively show displays conducted in the enabled mode. To clarify the difference between the disabled and enabled modes, the same map area is shown in FIGS. 6A and 5. FIGS. 5 and 6A show the switching manner of the modes. That is, when the operation mode is changed from the disabled to enabled mode while the vehicle is travelling in the area shown in FIG. 5 in which intersections X and Y are located, the map scrolls (moves) to the right together with the vehicle marker A as well as the intersections X and Y, so that the travel roads (indicated by the thick solid line D in FIGS. 6A and 6B) to the destination (not shown in FIGS. 6A, 6B) can be displayed on the screen at the maximum length. The map image and the vehicle marker are moved to the right because the travel road extends substantially to the left in FIG. 6A. Therefore, in the enabled mode, if travel roads extends, for example, in an upward direction, the vehicle marker A moves to the vicinity of the lower edge of the display screen.

FIG. 6A shows a "starting screen" of the enabled mode. In the enabled mode, as the vehicle starts to move, the vehicle marker A starts to move on the map image without the map image scrolling, as shown in FIG. 6B. In a starting screen, travel roads are displayed at the maximum length.

In the enabled mode, when the vehicle has moved along and has reached, for example, a point indicated by Z in FIG. 6B, the screen is switched to one of the area adjacent to Z point (this new screen is also a starting screen). On this new starting screen, the vehicle marker A starts to move again to coincide with the movement of the vehicle.

Control Procedures

Figure 7:
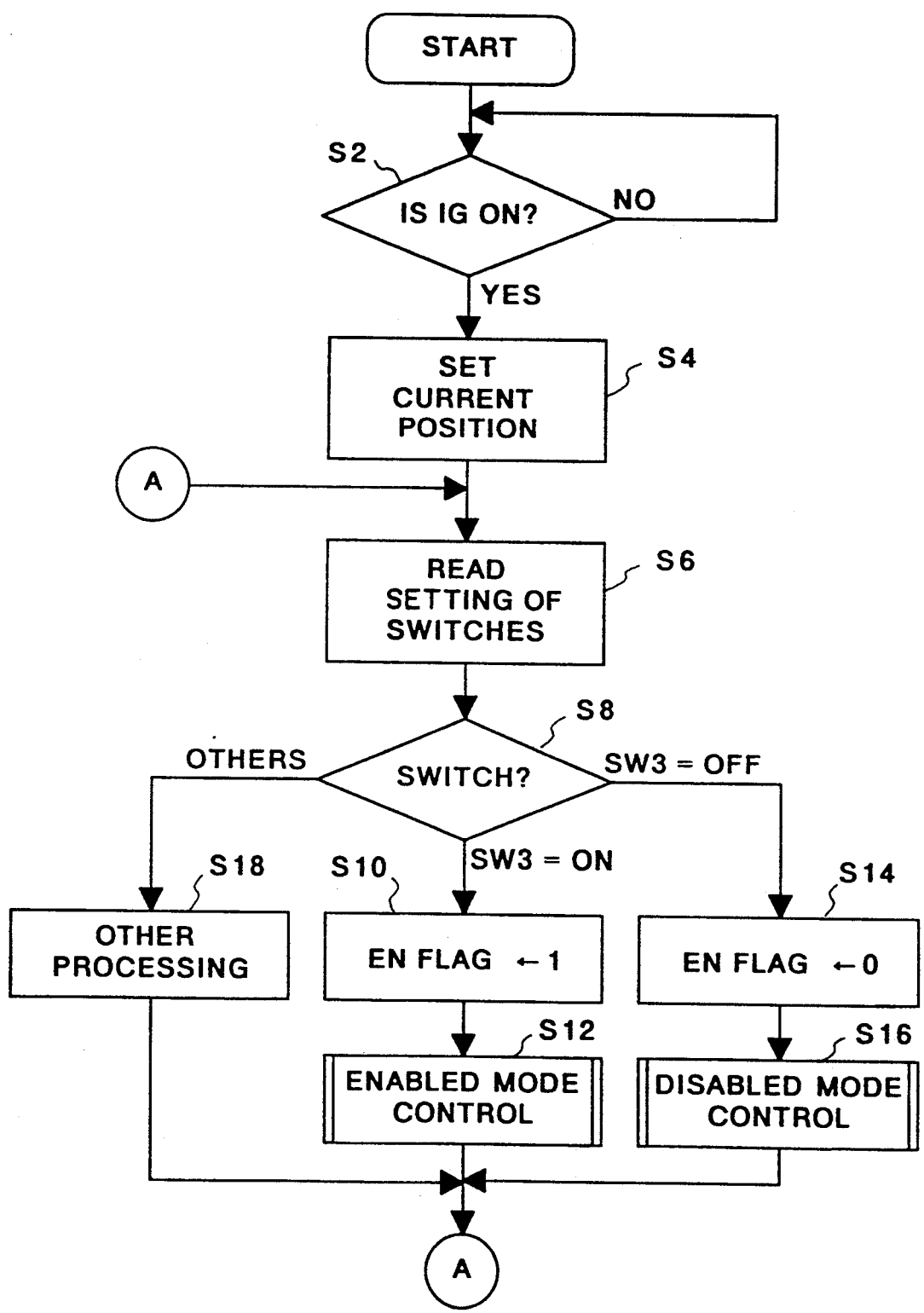
FIG. 7 is a flowchart of the main routine of the control procedures of the system of FIG. 1.

FIG. 7 is a flowchart of the control procedures for setting a mode, i.e., for changing over the mode between the enabled and disabled modes.

Figure 8:
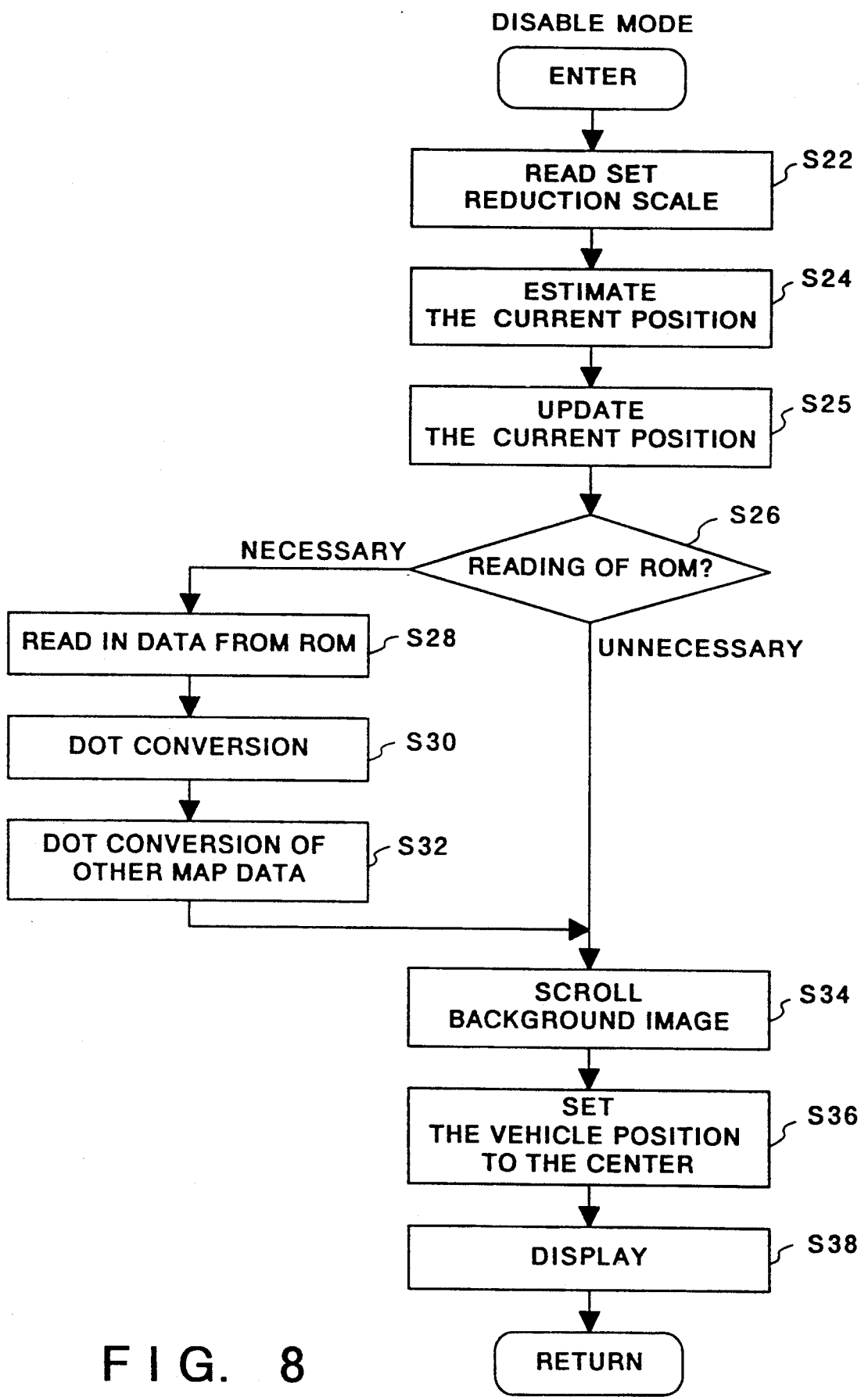
FIG. 8 is a flowchart of the control procedures for the disabled mode display control.

In step S2, The system (CPU 7) awaits turning on of the power source for the vehicle. In step S4, the current position of the vehicle is set. Generally, this current position is taught to the system manually by the driver through the touch panel 23. In step S6, the set state of the switches is read. In step S8, the control is switched over in accordance with the setting of the switches. More specifically, if the switch SW3 is on, a flag EN indicating the enabled mode control is turned on in Step S10. Thereafter, in step S12, the enabled mode control is executed. If it is determined in step S8 that the switch SW3 is off, the EN flag is turned off in step S14, and then the disabled mode control is executed in step S16. The disabled mode control is shown in FIG. 8, and the enabled mode control in FIGS. 9A, 9B and 9C.

First, the disabled mode control will be explained in detail with reference to the flowchart of FIG. 8.

In step S22, a map reduction scale set by the switch SW6 is read out. In step S24, the current position is estimated using the GPS device 19, the distance sensor 21 and the direction sensor 20. In step S25, the estimated current position is stored in the first field shown in FIG. 3 as the "current position" data. In step S26, it is determined whether or not the new screen should be read in into the image memory 10 from the CD-ROM 25a when the vehicle symbol A moves from the previously estimated vehicle position to the presently estimated vehicle position. The answer becomes YES when the vehicle position has reached the point indicated by the broken line 300 in FIG. 4. If the answer is NO, the process goes to step S34 and the screen scrolls such that the vehicle position can be maintained to the center thereof. Then, in step S36, the graphic data representing the arrow A which symbolizes the vehicle is written at the center of the screen. Consequently, in step S38, such a screen as shown in FIG. 5 is displayed on CRT 26.

If it is determined in step S36 that the new screen should be read in from the CD-ROM 25a, the control goes to step S28 and a new screen data is read in from the ROM 25a. In step S30, the newly read "outline data" (vector data) is converted into dot data representing the roads or the like and the converted dot data is written into the image memory 10. In step S32, the newly read name and graphic data and traffic information (received through the reception device 24) are converted into the dot data and the converted dot data is written in the image memory 10. In steps S34 and S36, the background map image is scrolled and then the vehicle position is updated. In step S32, if the travel roads to the destination are already set, they are displayed in a thicker line.

Thus, the display control shown in FIG. 5 is executed so long as the switch SW3 is off.

Enabled Mode Control

Figure 9A:
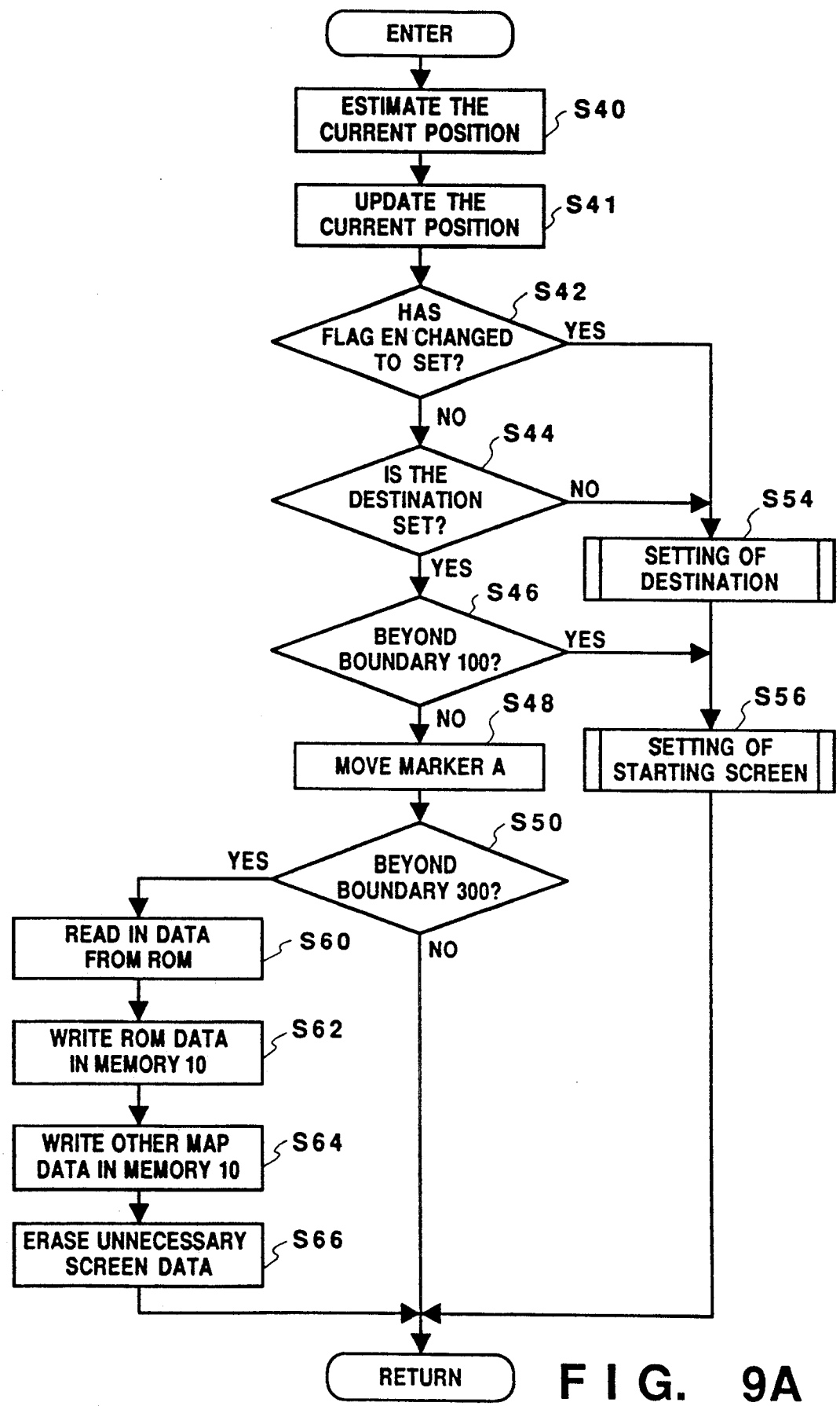
FIG. 9A to 9C are flowcharts of the control procedures for the enabled mode display control.

When the switch SW3 is turned on, the enabled mode control procedures shown in FIG. 9A will be executed.

More specifically, in step S40, the current position of the vehicle is estimated using the GPS device 19, the distance sensor 21 and the direction sensor 20. In step S41, the current position is stored as "the current position" data (FIG. 3). In step S42, it is determined whether or not the system has changed from disabled to enabled mode by checking the EN flag. If the EN flag has changed from reset to set state, the control goes to step S54 and the destination setting routine shown in FIG. 9B will be executed.

Figure 9B:
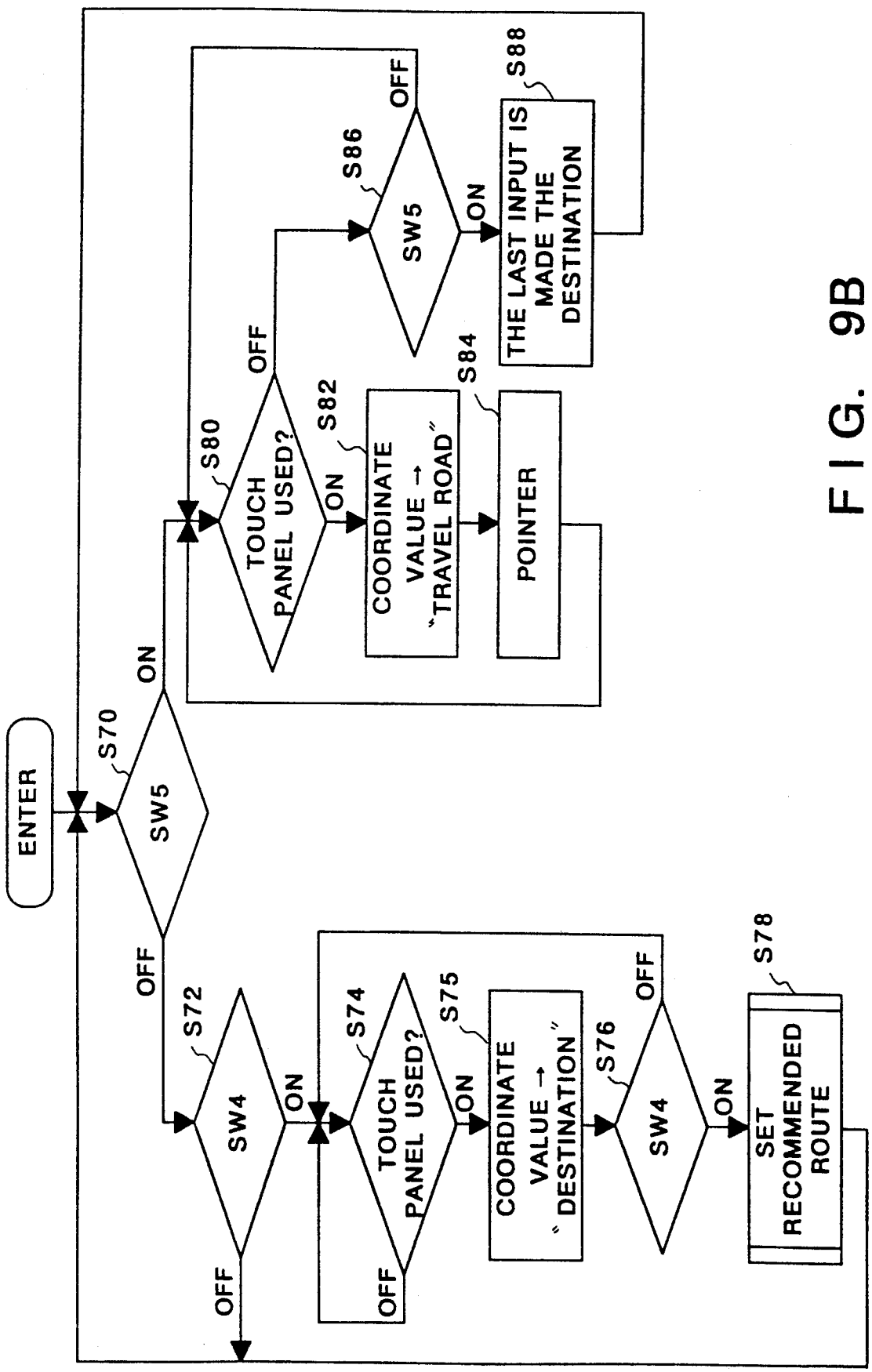

Describing the destination setting routine with reference to the flowchart of FIG. 9B, processing from steps S72 to S78 is the control procedures executed when the system provides a recommendation route ("travel roads") which leads to a destination the driver designates, whereas processing from steps S80 to S88 is the control procedures executed when the driver provides successive travel roads to the system, as well as a destination.

Whether the travel roads are provided by the system or the driver is determined by the activation or non-activiation of switch SW5.

That is, in steps S70 and S72, the system waits for the turning on of the momentary type switch SW4 or SW5. If the switch SW5 is off and the switch SW4 is on, a coordinated position input from the touch panel 23 is stored in the second field shown in FIG. 3 as "destination" data. In a plurality of coordinate positions input before the switch SW4 is turned on again, the last input coordinate position becomes the destination. If it is determined in step S76 that the switch SW4 is on, the recommended road setting routine is executed in step S78. Such a recommended road setting control is known. That is, the road data (a plurality) shown in FIG. 2B is searched for by using, for example, the binary research process, and the shortest route to the destination set in step S75 is determined as "travel roads".

If it is determined in step S70 that the switch SW5 is on, the control procedures for setting travel roads by the driver will be executed in steps S80 to S88. More specifically, the plurality of coordinate positions and the road data therefor are successively stored in the plurality of "travel road" fields shown in FIG. 3 through the touch panel 23 (which is activated in step S80) in steps S82 to S84. The last input coordinate position when the switch SW5 is turned on again, is stored in the third field shown in FIG. 3 as "destination" data, in step S88.

The destination and the travel roads are thus set by the system or the driver.

Returning to FIG. 9A, when the destination and the travel roads are set, the starting screen setting routine (FIG. 9C) is executed in step S56.

Figure 9C:
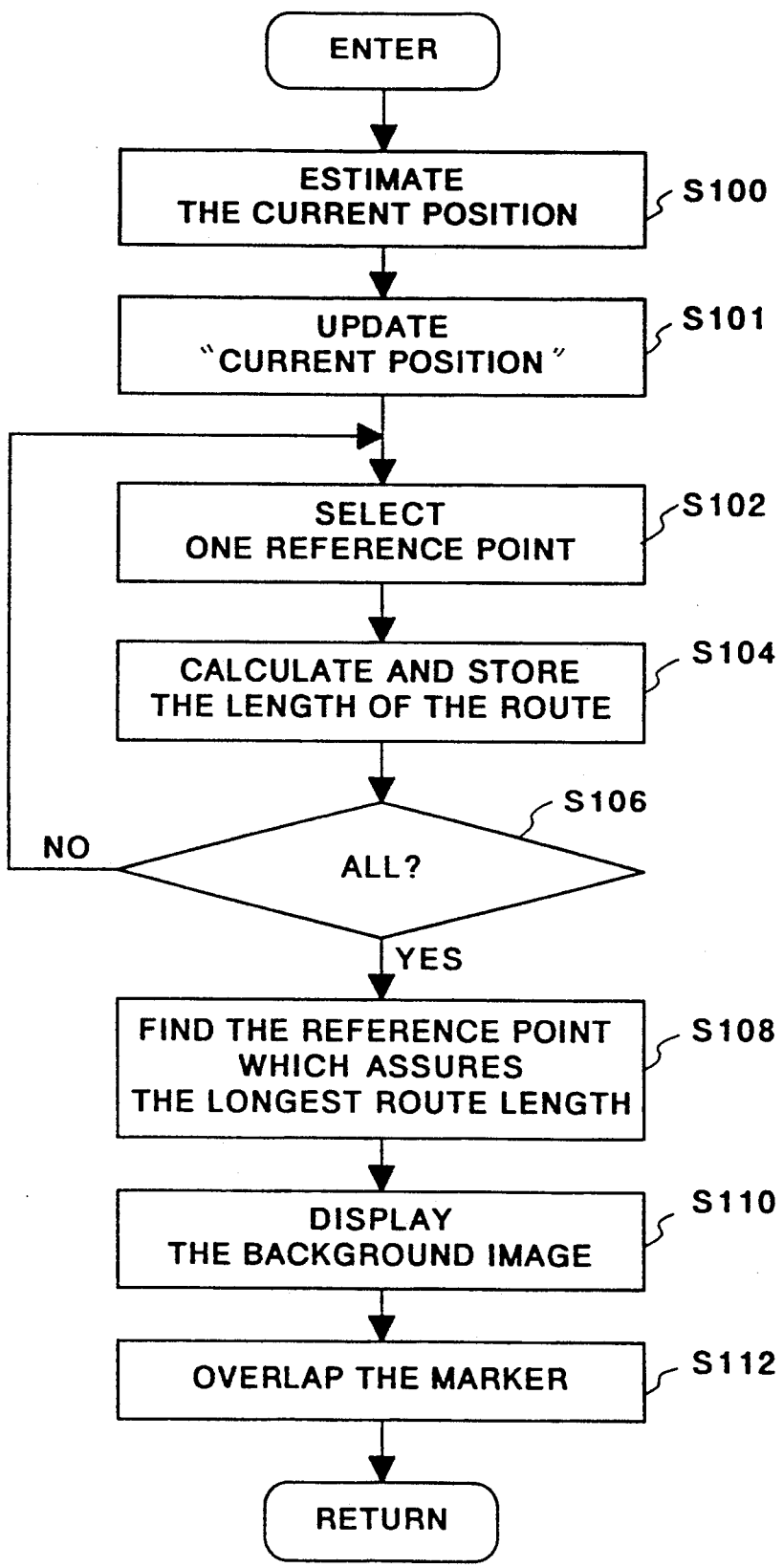
Figure 10A:
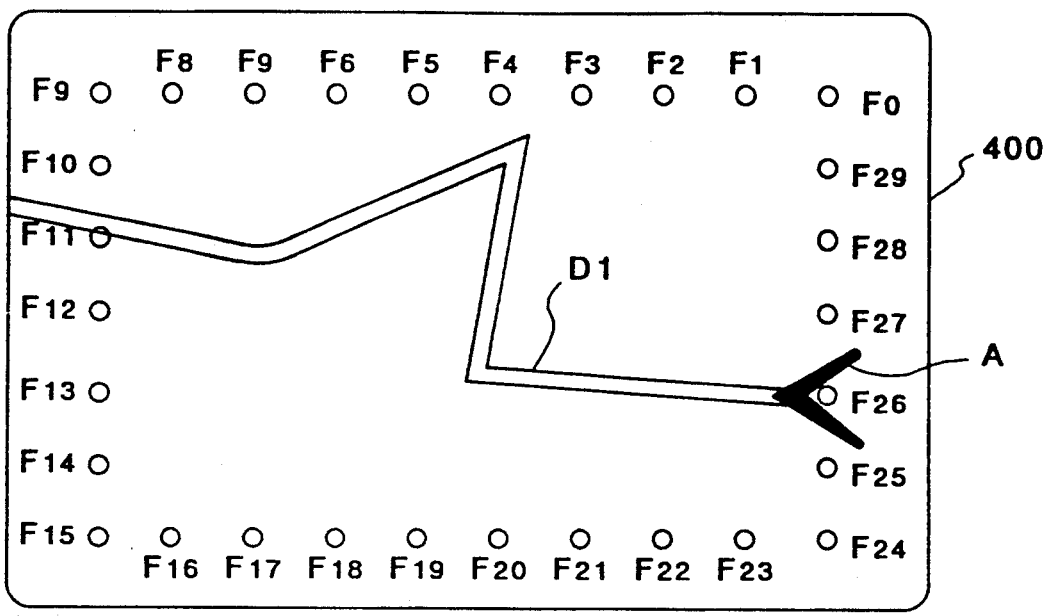
FIGS. 10A and 10B explain the principle of determining reference points required to maximize the length of the portion on which the road can be displayed in the enabled mode control of the embodiment.
Figure 10B:
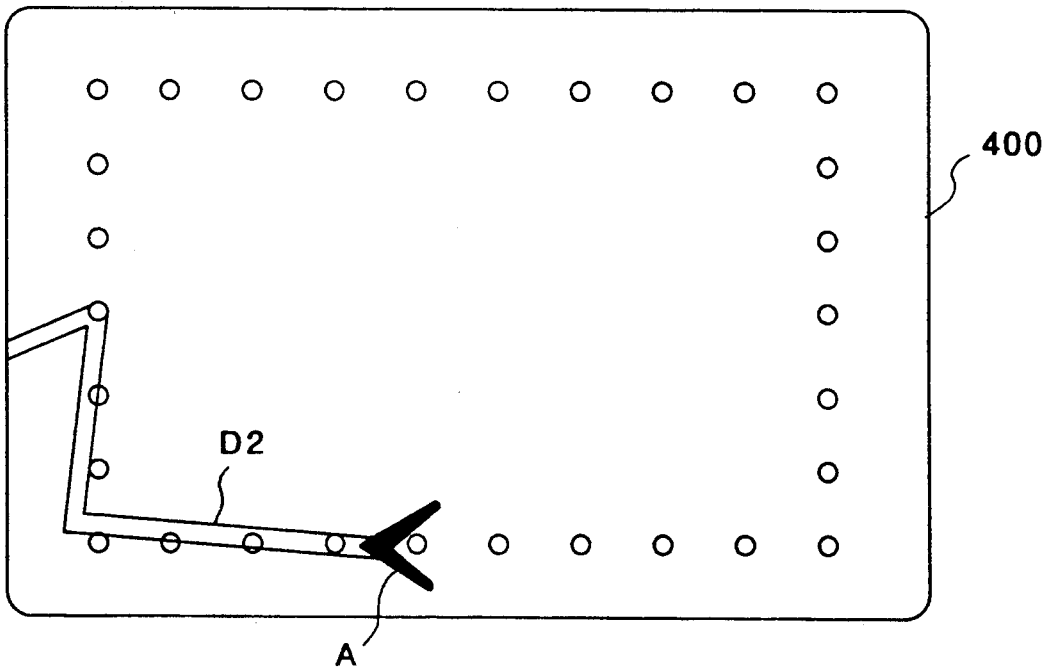

The setting of the starting screen executed in accordance with the control procedures shown in FIG. 9C will be outlined with reference to FIGS. 10A and 10B.

In FIG. 10A, a reference numeral 400 denotes a memory space displayed by the CRT 26. This space has thirty reference points indexed by $F_0$ to $F_{29}$. The reference points $F_0$ to $F_{29}$ are indicated in the form of the broken line 100 in FIG. 4. As the starting screen is created, the current position of the vehicle is located on either one of these reference points. The top of the memory space is fixedly directed to the north. Therefore, in a starting screen, when the current position of the vehicle is at any of these reference points $F_0$ to $F_{29}$, the length of the travel road displayed on the screen can be readily calculated. For example, it is possible to readily calculate the overall length $D_1$ or $D_2$ of the displayed portion of travel roads as shown in FIGS. 10A or 10B. $D_1$ of FIG. 10A is the displayed portion of the travel roads when the current position of the vehicle is located at the reference point $F_{26}$, and $D_2$ of FIG. 10B the displayed portion when the current position is located at reference point $F_{19}$.

In this embodiment, the starting screen is set by finding a single reference point from $F_0$ to $F_{29}$ which ensures that the travel road is displayed on the screen at the maximum length and by scrolling the map image such that the vehicle position is located on the found reference point.

More specifically, in step S100 of FIG. 9C, the "current position" data (FIG. 3) stored in step S40 is read. In step S102, one of the reference points $F_0$ to $F_{29}$ is selected. In step S104, the length of the travel roads displayed if the vehicle position is located on that selected reference point is calculated and stored. Processing from steps S102 to 104 is repeated for all the reference points $F_0$ to $F_{29}$. In step S108, the reference point which ensures that the travel roads are displayed on the screen at the maximum length is selected. In step S110, the background map image is scrolled such that the current position of the vehicle is located on the selected reference point. In step S112, the graphic of the vehicle marker A is laid on the selected reference point.

Thus, a starting screen such as that shown in FIG. 6A is displayed on the screen of the CRT 26.

When the starting screen has been set, the control goes from step S40, step S44, and then to step S46. In step S44, it is determined again whether or not the destination is already set. It is necessary for a new destination to be input by the driver in a case where the switch SW3 is still on when the vehicle has arrived at the previously set destination. In step S46, it is determined whether or not the estimated current position has reached the virtual boundary 100 shown in FIG. 4 (the boundary made up of the reference points $F_0$ to $F_{29}$ shown in FIG. 10A), i.e., whether or not the vehicle has moved to the boundary 100. If the vehicle has not yet reached the boundary, the marker A is moved to a position specified by the "current position" data, in step S48 (see also FIG. 6B). Thus, the vehicle symbol moves on the non-scrolled map image to coincide with the actual movement of the vehicle.

The present vehicle position estimated in step S40 reaching the boundary 100 means the vehicle position being close to the edge portion of the screen and the length of the displayed travel road being thus short. Therefore, the control returns to step S56 and the starting screen setting routine is executed to update the present screen.

In step S50, it is determined that the current position of the vehicle has reached the boundary 300 shown in FIG. 4. If the current position of the vehicle has reached the boundary 300, a new map data on the area adjacent to that should be read in from the CD-ROM 25a. Therefore, the adjoining screen data is read in from the ROM 25a in step S60, and then the read "outline data" (FIG. 2A) is converted into dot data representing the roads or the like, and is stored in the image memory 10 in step S62. In step S64, images other than the roads or buildings, such as one-way traffic or traffic jam symbol, are also written in the image memory 10. In step S66, unnecessary old screen data is erased from the image memory 10 in exchange for the new screen.

Modification

As has been discussed in connection with the flowchart of FIG. 9C, when a starting screen is created all of the thirty reference points $F_0$ to $F_{29}$ are referred to in the above embodiment. Consequently, it takes lots of time to determine the starting screen. The modification, which will be described below, is directed to an increase of the speed at which the starting screen is determined.

Figure 11:
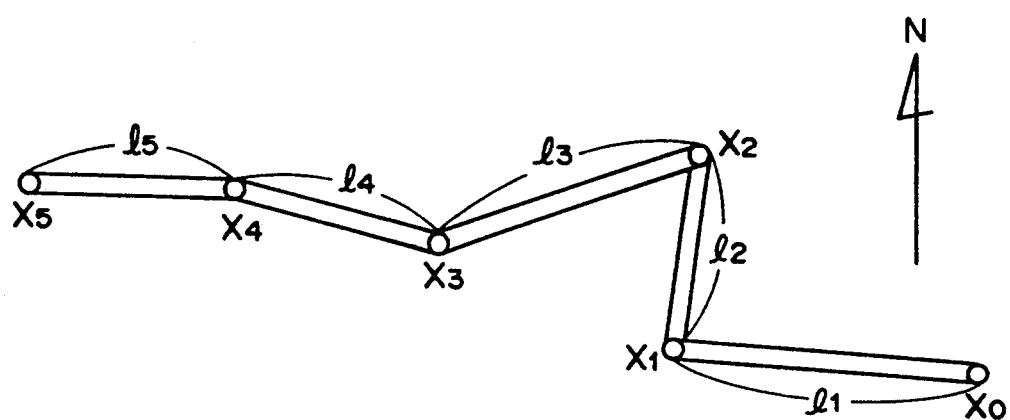

FIG. 11 shows an example of travel roads set by the driver or the system. In this example, the roads which the vehicle will travel start from the current position $X_0$, and then go on to $X_1$, $X_2$, $X_3$, $X_4$ and $X_5$. The individual travel roads have a length of $l_1$, $l_2$ and so on.

Generally, as a route which leads to a destination is set as the shortest route thereto, the route should have a direction. To put it strongly at its most extreme, the route to the destination may not be set on a winding course. This modification is characterized in that a roughly estimated direction (referred to as "rough direction") of the route is found first and in that the number of candidate reference points at which the vehicle position may be located can be reduced by using that direction.

How many travel road samples may be used to determine the "rough direction" will be discussed with reference to FIG. 11. The purpose of the present invention is to display travel roads on the screen at the maximum length. In other words, the "rough direction" should be considered not as that of the final destination from the current position but as that of the sampled travel roads that can be displayed on one screen from the current position.

The maximum length L that the screen having dimensions of $a \times b$ ($a > b$) can be displayed at a reduction scale k is given by $$L = a/k$$

Therefore, the direction of the travel roads having the same length L can be estimated as the direction of the destination. Also, as the travel road is generally set in a curved fashion, we have new threshold as follows:

$$L = L \times \alpha (\text{where, } \alpha > 1)$$

Regarding the new threshold L, n samples of the travel roads (five samples in the case shown in FIG. 11), which satisfy $$\sum_{i=1}^{n} l_i \geq L$$

and which start from $X_0$, are chosen. Then, the direction of the straight line drawn from the current position $X_0$ to the end of the nth travel road (which is $X_5$ in the case shown in FIG. 11) is regarded as the aforementioned "rough direction" m. That is, $$m = \text{inclination of } \overline{X_0 X_n}$$

The range of the reference points at which the current position may be located can be roughly determined using this inclination m.

Figure 12:
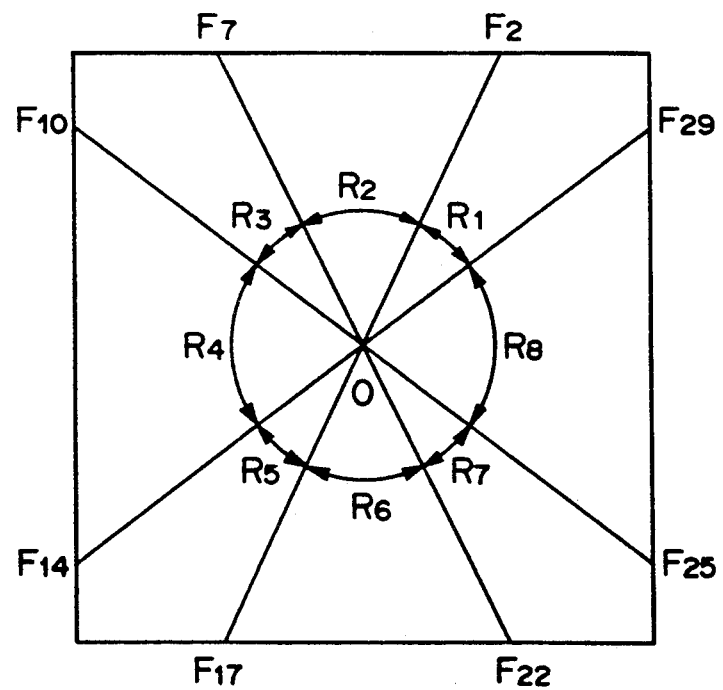

As shown in FIG. 12, the screen is divided into eight areas $R_1$ to $R_8$ over 360° with the center O of the screen as the center of the areas. The range of each area is defined as shown in FIG. 13. That is, the range $R_1$ is defined by a line drawn from the center O to $F_{29}$ and a line drawn from the center O to $F_2$. The range $R_K$ is defined by the inclinations of the two lines. These inclinations are expressed by $m_{k1}$ and $m_{k2}$. It is therefore possible to determine one of the ranges $R_1$ to $R_8$ to which the direction of the sampled travel roads belongs, by comparing the inclination m of the travel roads with the inclinations $m_{k1}$ and $m_{k2}$ of the two lines that define each range. When the range R is determined, the reference points to be referred to can be determined in accordance with the table shown in FIG. 13. The number of reference points listed in the table shown in FIG. 13 is six at the maximum. Consequently, the number of reference points to be referred to in the modification can be greatly reduced from the number of reference points (which is thirty) to be referred to in the above-described embodiment.

Figure 14:
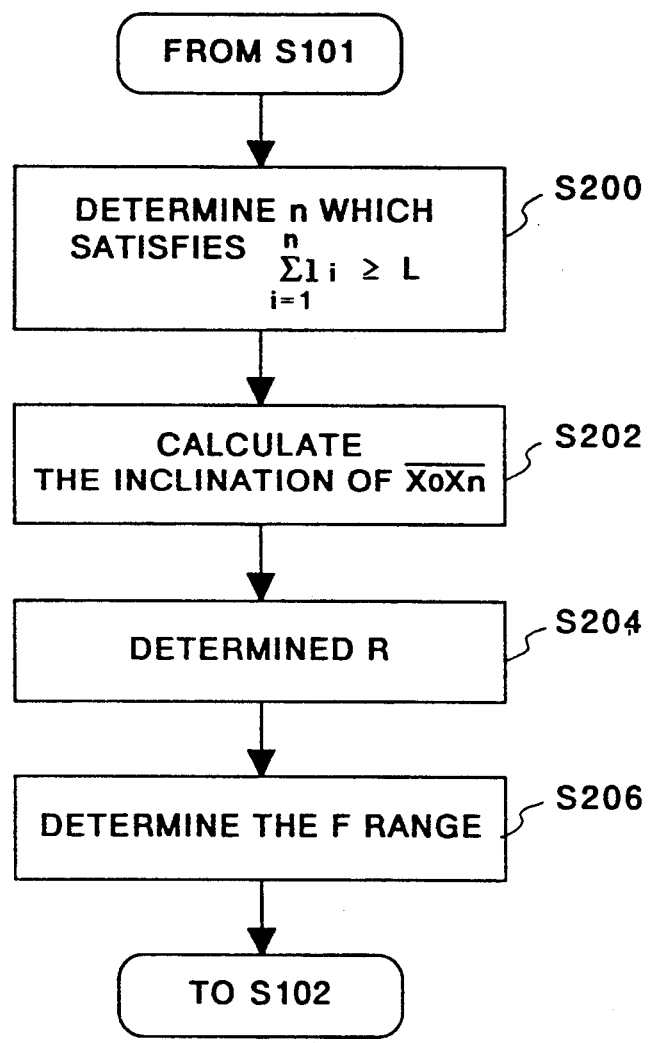
FIG. 14 is a flowchart of the control procedures for the modification.

FIG. 14 shows the control procedures to be inserted between the step S101 and step S102 of FIG. 9C.

More specifically, in step S200, N samples of the travel roads, which satisfy $$\sum_{i=1}^{n} l_i \geq L$$

and which start from $X_0$, are chosen. In step S202, the direction m of the straight line drawn from the current position $X_0$ to the end of the nth travel road is calculated. That is, $$m = \text{inclination of } \overline{X_0 X_n}$$

In step S204, a range R which contains this line is searched for from ranges $R_1$ to $R_8$. In step S206, the group of reference points corresponding to the determined range R is selected as candidate points and the selected candidate points are used in steps S102 to S108.

The present invention can further be modified.

For example, in the above embodiment, the system enters the enabled mode when the switch SW3 is turned on. However, it may also be arranged such that the system automatically enters the enabled mode when the destination and the travel roads are set.

In the above embodiment, the boundary 100 shown in FIG. 4 which initiates updating of the starting screen coincides with one defined by the reference points shown in FIG. 10. However, the boundary 100 may also be a certain area located at the central portion of the screen. Furthermore, it may be arranged such that updating of the starting screen is initiated when the distance through which the vehicle has travelled has reached, for example, one half of the threshold L (L/2).

Furthermore, in this invention, the number of reference points is not limited to thirty.

The present invention is not limited to the above embodiments and various changes and modifications can be made within the spirit and scope of the present invention. Therefore, to apprise the public of the scope of the present invention the following claims are made.

What is claimed is:

1. A navigation apparatus for vehicles, having a display device of fixed display size for displaying map information, comprising:

route setting means for setting a route which a driver will take to get to a destination on the basis of the map information, the set route including a plurality of route segments;

estimation means for estimating a current vehicle position on the set route;

timing setting means for setting a timing at which a background display image on the display device is replaced;

display area setting means for setting a plurality of display areas, each having the current vehicle position displayed therein, at a timing set by the timing setting means;

calculation means for calculating, in response to said display area setting means, the length of the route segments of the set route displayed within each of said display areas;

display area selecting means for selecting one of said display areas from the plurality of display areas such that the selected display area shows the route having the longest calculated length and the route is displayed substantially at the maximum length within the selected display device; and display control means responsive to the display areas selecting means for displaying the route and the map information within the selected display area as the background display image, and for displaying and moving a marker symbol of the vehicle in an overlapped manner within the selected display area as the vehicle drives on the route.

2. The navigation apparatus according to claim 1, wherein said display area setting means sets the plurality of display areas at the timing set by the timing setting means so that the current position of the vehicle is located at the edge of each display areas.

3. The navigation apparatus according to claim 1, wherein the azimuth of each display area is fixed with respect to that of the map information.

4. The navigation apparatus according to claim 3, wherein said timing setting means detects a timing at which the vehicle approaches the periphery of the selected display area;

wherein said display area setting means includes:
a memory for storing an image displayed on the display device, a space of said memory containing a plurality of reference points virtually provided at a periphery of the display area; and
means for setting an individual display area at the timing set by the timing setting means so as to accord the current position of the vehicle with one of the reference points;

wherein said calculation means includes:
means for calculating the length of the route that is displayed in each display area when the current position is located at one of the reference points;

wherein said display area selection means includes:
means for searching for the reference point from said plurality of reference points which ensures that the route is displayed at the maximum length; and means for locating the current position to the selected reference point.

5. The navigation apparatus according to claim 1, wherein said route is set by the driver.

6. The navigation apparatus according to claim 1, further comprising:
    means operated by the driver for inputting the destination; and
    means for setting the route on the basis of the destination and the current position.

7. The navigation apparatus according to claim 4, further comprising: means for narrowing the number of reference points that can be candidates from the plurality of reference points.

8. The navigation apparatus according to claim 7, wherein said means for narrowing the number of reference points detects a direction of a point which is part of the route from the current position, and makes only the reference points present in the vicinity of the direction as candidates.

* * * * *